July 18, 1967 R. A. WALLER 3,331,294
FLEXIBLE INSERT
Filed Feb. 14, 1964 3 Sheets-Sheet 1

INVENTOR
R. A. Waller
By *Holcomb, Wetherill & Brisebois*
ATTORNEYS

July 18, 1967 R. A. WALLER 3,331,294
FLEXIBLE INSERT
Filed Feb. 14, 1964 3 Sheets-Sheet 2
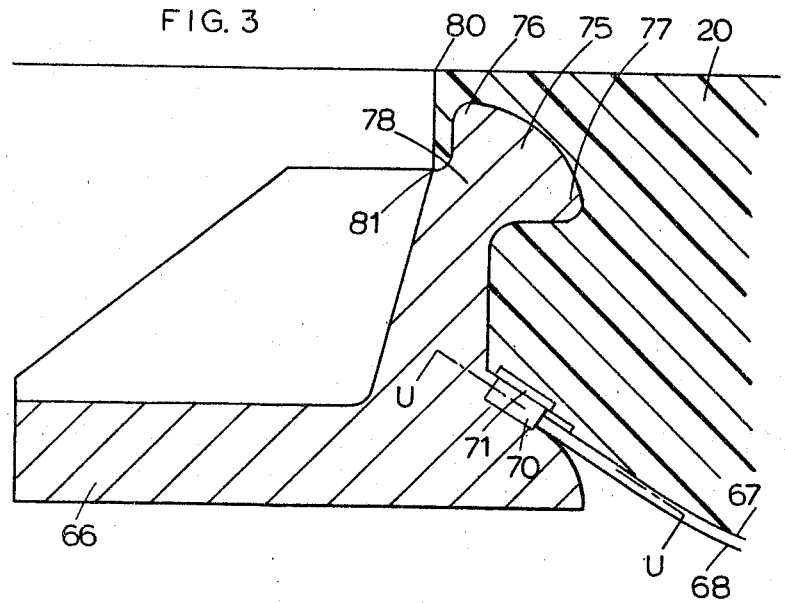
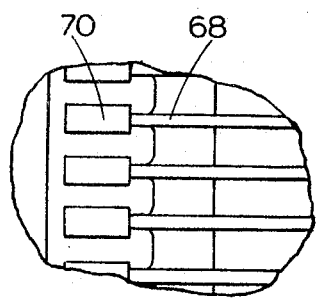 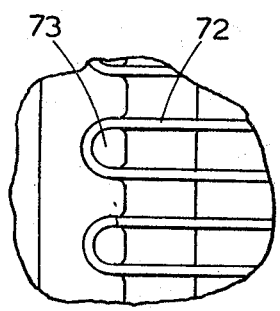
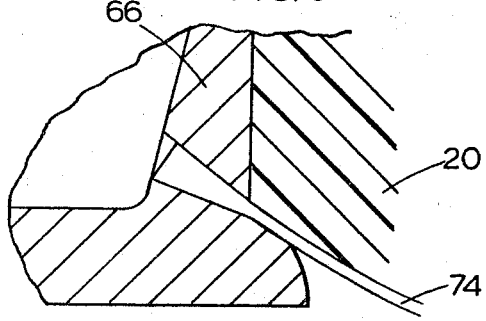
INVENTOR
R. A. Waller
By Holcomb, Vetter &...
ATTORNEYS July 18, 1967  R. A. WALLER  3,331,294
FLEXIBLE INSERT
Filed Feb. 14, 1964  3 Sheets-Sheet 3
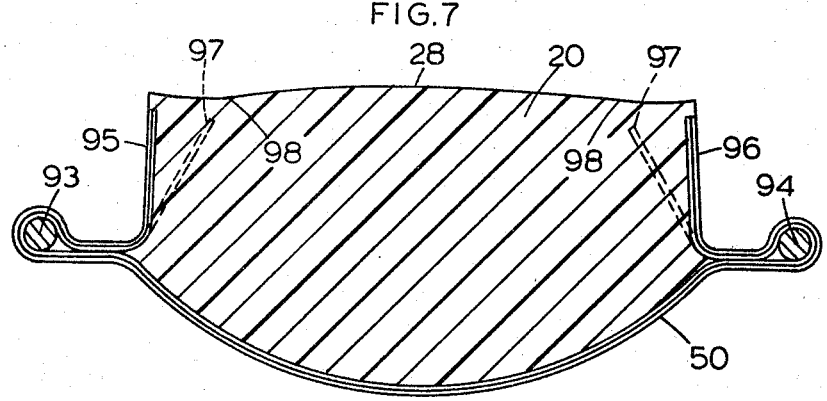
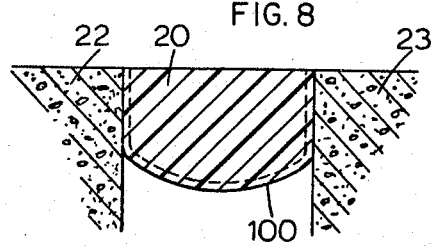
INVENTOR
R. A. Waller
ATTORNEYS

United States Patent Office 3,331,294
Patented July 18, 1967

3,331,294
FLEXIBLE INSERT
Roy A. Waller, Carshalton, England, assignor to
Kins Developments Limited
Filed Feb. 14, 1964, Ser. No. 344,944
Claims priority, application Great Britain, Feb. 19, 1963,
6,621/63
9 Claims. (Cl. 94—18)

This invention relates to a flexible insert for insertion in a gap in a construction where it will be deformed as by expansion and contraction of the construction which will vary the size of the gap.

Applications for this insert are to be found in roads and bridge decks at the load carrying surfaces and in buildings at the exterior cladding units.

Inserts for such a purpose have been previously proposed, comprising a body of rubber having a plane upper surface and a convexly curved under surface, the latter bulging consequent upon compression.

Previous proposals to support the underside of the insert against buckling have been to provide one or more rigid support members each secured to one or other side of the gap and each extending part way across the gap to support the insert while allowing expansion and contraction of the gap.

Inserts with such support members are expensive to make and very expensive to install. The support members are bulky, heavy and relatively complicated in construction. Considerable care is required to ensure that they are sufficiently firmly mounted to provide the desired support. The mounting means for them have to be correspondingly massive, particularly since they are supported each at one side of the gap only, in cantilever.

Consequently, it may often be uneconomic to employ such inserts in some constructions.

It is an object of the invention to provide a flexible insert for insertion in a gap in a construction, which is effective, simple to manufacture and easy to install.

It is another object of the invention to provide a flexible insert which is inherently self-supported against buckling by compressive side loads, and does not require external support underneath it.

The objects of the invention are achieved by providing flexible but inextensible reinforcement in or adjacent the lower surface of the insert, and attaching the reinforcement to the construction, for instance, road or bridge sections, at the sides of the gap, to support the insert.

The cost of making and installing such an insert may be as little as half the cost of prior art inserts.

Features and advantages of the invention will be apparent from the following description, given by way of example only, with reference to the accompanying drawings, in which:

FIGURE 3 shows a vertical section through a detail of an insert;

FIGURE 4 shows a scrap view along the line U—U of FIGURE 3;

FIGURE 5 shows a similar view to FIGURE 4 of another insert;

FIGURE 6 shows a vertical section through a detail of a further insert;

FIGURE 7 shows a vertical section through a further insert; and

FIGURE 8 shows a vertical section through another insert suitable for a narrow gap.

In a construction such as a road, bridge deck or a building it is necessary to allow for expansion and contraction of the construction at the load-carrying surface of the road or bridge deck or at the surface cladding units of the building. The flexible insert in accordance with the invention may be inserted at the load-carrying surface of a road or bridge deck in a gap provided transversely across or inclined with respect to the direction of expansion or contraction, and with its flat surface aligned with the adjacent surfaces of the road or bridge deck. The insert may be inserted in a gap between cladding units of a building with its flat surface aligned with the surfaces of adjacent units. The insert is so arranged that its flat surface remains substantially flat during relative movement of the adjacent parts of the construction such as during expansion and contraction of the construction.

To enable the flat surface of the insert to remain substantially flat the underside of the or each insert member is so shaped and reinforced with a flexible material different from the insert material as to deform during expansion and contraction of the construction thus allowing the flat surface to remain substantially flat.

More than one insert may be inserted in a gap of a construction in order that large deflections can be taken up.

The flexible insert for use in roads and bridge decks is arranged to be able to deal with both moving and static loads at the flat, load-carrying surface, for example due to motor vehicles passing over the insert or coming to rest with one or more wheels on the insert.

As used in buildings the flexible insert may not need to carry any load and it may only be necessary for the insert surface to remain flat to maintain the visible shape of the building cladding units.

Figure 1:
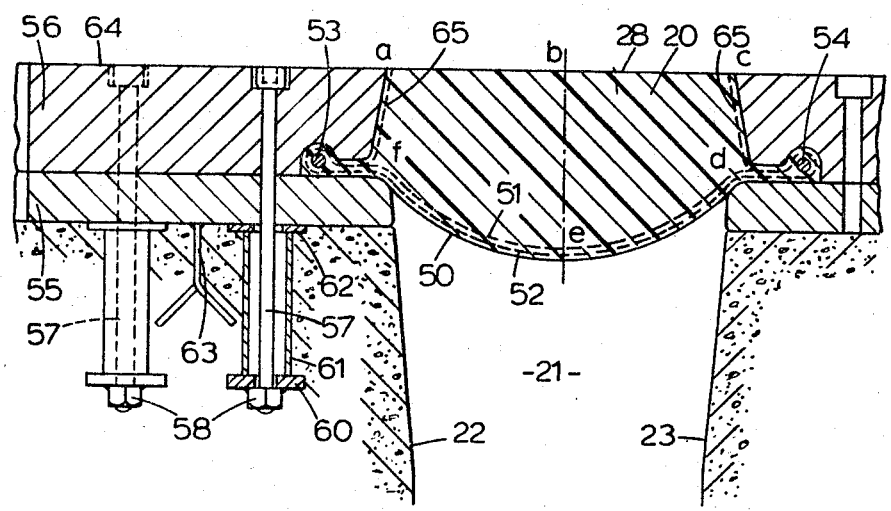
FIGURE 1 shows a vertical section through an insert and the surrounding assembly.

Referring now to FIGURE 1 there is shown a flexible insert 20 which has been inserted in an expansion joint or gap 21 formed between two adjacent parts 22, 23 of a construction such as a road, bridge deck or building.

Figure 2:
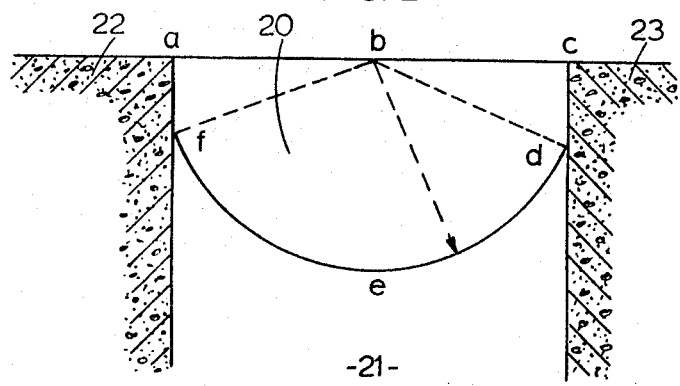
FIGURE 2 shows a diagrammatical vertical section through the insert of FIGURE 1.

The geometry of the insert 20 of FIGURE 1 is shown diagrammatically in FIGURE 2 which shows an insert in its mean position between maximum and minimum deflections under compression. The shape of the insert $a$, $b$, $c$, $d$, $e$, $f$ has the property that under horizontal deformation and with the cross-sectional area $a$, $b$, $c$, $d$, $e$, $f$ remaining constant, as it would if the insert material was rubber, there is substantially no overall vertical movement of the boundary $a$, $b$, $c$. At the same time the perimeter $d$, $e$, $f$ remains constant in length and this perimeter can therefore be reinforced with a flexible but inextensible material without the deflection characteristics of the insert being affected. Such an inextensible material assists to resist vertical loads placed on the surface $a$, $b$, $c$ of the insert.

Referring again to FIGURE 1 the insert has a curved under surface 50 which corresponds to the periphery $d$, $e$, $f$ of FIGURE 2, and which is provided with flexible but inextensible reinforcement. In the mean position as shown the perimeter $d$, $e$, $f$ is a part circle having a centre of curvature which lies in the boundary $a$, $b$, $c$ at $b$. In the undeflected state this centre of curvature lies above the boundary $a$, $b$, $c$ and in the fully compressed state the centre of curvature lies below this boundary, i.e., the radius of curvature varies with the degree of compression.

This reinforcement is in two layers 51 and 52 which are both secured to the adjacent parts 22, 23 of the construction so that the lengths of the layers 51 and 52 between parts 22 and 23 remain constant over the whole range of relative movements between the parts of the construction.

The layers 51 and 52 are secured by being passed over beads or rods 53 and 54 which extend parallel to the insert in the direction perpendicular to the plane of the figure, and which are clamped respectively to parts 22 and 23.

As shown at the left hand side of FIGURE 1 the part 22 of the construction has screwed to it plates 55 and 56 which are held one against the other against part 22 by screws 57. The plate 56 is provided with a recess for receiving rod 53 and this rod is tightly clamped with the layers 51 and 52 rolled therearound and the plates 55 and 56 screwed down.

The screws 57 screw into nuts 58 which are set in part 22, the nuts 58 being welded to washers 60. Tubes 61 and washers 62 are also set in the part 22 to facilitate location of screws 57.

During assembly the plate 55 is held in position by tangs 63 which have offset tang ends to increase the resistance to displacement of the plate 55. The plates 55 and 56 may be made of any suitable corrosion free material such as a metal or a resin. The top surface 64 of plate 56 may be grooved or otherwise roughened to increase its frictional properties.

The rod 53 may be made of metal or may be merely a roll of the reinforcement layers 51 and 52 rolled up to an appropriate size. The reinforcement also extends up the sides of the insert at 65 and it will be noted that these sides are inclined inwardly towards the upper surface 28 of the insert and that the plates 56 are shaped complementarily.

Referring now to FIGURE 3 there is shown the side portion of an insert 20, the material of which is bonded to a keep plate 66. The under surface 67 of the insert is reinforced with wire ropes 68 which are flexible and virtually inextensible. The wire ropes are attached to the keep plate 66 by swaged ends 70 which locate in suitable slots in the keep plate and which are retained in the slots by a retainer member 71. Each wire rope is attached to the two keep plates, i.e., one at each side of the insert.

FIGURE 5 shows a similar view to FIGURE 4 of an embodiment in which a single continuous wire rope 72 is passed alternately over projections 73 on opposing keep plates to form the reinforcement.

FIGURE 6 shows an embodiment in which a plurality of reinforcing wire ropes 74 have their ends cast into the keep plate. The ends of the ropes are slightly splayed and the cast material prevents withdrawal of the wire ropes.

The various ways in which the reinforcement can be retained, as shown in FIGURES 1 and 3 to 6, all serve the same purpose of preventing an alteration in the length of reinforcement provided at the undersurface of the insert whilst achieving flexibility of the reinforcement and providing reaction supports for loads causing tension in the reinforcement.

Referring again to FIGURE 3 the keep plate 66 has an integral head 75 which extends along the whole side of the insert, i.e., perpendicular to the plane of the figure. The head has two protruding rounded edges 76, 77 and a narrower neck portion 78. The insert material is bonded to the whole surface of the head 75 so that the insert material overlies the head 75 and extends to a position adjacent the neck portion 78 and on the further side thereof from the remainder of the insert.

The purpose of the head 75 is to reduce the load on the insert at the edge of the bond between the insert and keep plate by removing this edge from the upper surface (at the edge 80) to a position down the side of the insert (at the edge 81). In this way the edge of the bond is not subjected to heavy stresses, as it would be if it was positioned at the upper surface and the upper surface of the insert was a road surface, and the risk of permanent damage being done to the bond is much reduced.

In addition, the rounded edge 76 projects towards the edge 80 of the insert and provides mechanical support to minimise the possibility of dirt or water entering along the edge 80 between the insert and the adjacent part of the construction.

Further, the portion of the insert extending from the edge 81, up and around the rounded edge 76 of the keep plate, provides a gradual transition from the edge of the bond to the full thickness of the insert.

Referring now to FIGURE 7 an insert 20 is shown having a substantially flat upper surface 28 and a curved lower surface 50.

The insert is shown in the undeflected or uncompressed position and the upper surface 28 has some slight undulations. These undulations completely disappear to leave the surface 28 completely flat when the insert is compressed to half the maximum deflection or compression and some slight undulations again appear as the deflection or compression is increased up to the maximum.

In the example illustrated the surface 28 is just over 8 inches wide (in the plane of the figure) and the under surface which is part cylindrical has a radius of curvature of approximately 6 inches, the centre of this radius being about 1½ inches centrally above the surface 28. In the condition of mean deflection the radius shortens and the centre of curvature lies in the surface 28 and in the fully compressed condition the radius shortens further and the centre of curvature lies below the surface 28. The maximum undulation (peak to peak) in the surface 28 is about ⅛ inch, i.e. 1/16 inch maximum undulation about the mean.

The under surface 50 is reinforced with two layers of fabric which are embedded in the insert material, the outer layer being covered with a layer of insert material approximately 1/32 inch. The reinforcement fabric has a strength of 2000 lb./inch. This fabric is passed over ½ inch diameter ropes 93, 94 and clamped in a similar manner to the arrangement shown in FIGURE 18, the ropes 93, 94 serving the same purpose as rods 53 and 54 of that figure.

In this arrangement the reinforcement extends up the majority of the side of the insert to a position about ¼ inch below the surface 28. The sides 95, 96 of the insert are sloped inwardly toward the surface 28 and the adjacent parts are shaped to correspond. In an alternative arrangement the inner layer of reinforcement is taken into the material of the insert (as shown in broken lines at 97) to reinforce the insert at the positions 98. At these positions 98, in the undeflected condition of the insert as illustrated, there exist hollows or dips in the surface, and with increasing compression these hollows or dips disappear and then become upstanding ridges. The reinforcement at 98 tends to resist this upward movement of the insert material.

The insert may be inserted with a certain amount of pre-compression so that when the gap increases to its maximum size in very cold weather the insert is still in compression. This prevents the insert being put in tension and maintains the insert in contact with the adjacent parts of the construction.

Such pre-compression may be applied in any convenient way as by means of clamps, wedges or eccentrics.

Easy insertion of the insert may be achieved by compressing the insert before insertion as by wires extending across the insert which can be cut after insertion.

Whilst the previously described inserts are suitable for relatively wide gaps, an even simpler construction of insert as shown in FIGURE 8 may be used for narrow gaps, for instance, in a road joint.

The insert 20 of FIGURE 8 is designed for a gap about one and a half inches wide, and is formed by a body having basically the shape shown in FIGURE 2. A flexible but inextensible reinforcement 100 is embedded in the sides and underneath of the insert body.

The sides of the insert body, together with the flexible reinforcement 100 embedded therein, are bonded to the adjacent parts 22, 23 of the road. The wheels of vehicles will span the gap, and the reinforcement provides sufficient support for what load the insert has to withstand.

As an alternative to the various arrangements shown in the drawings for providing damping, or in addition thereto, the inserts may be formed from a material having a high hysteresis.

All the inserts shown in the drawings are arranged to prevent the ingress of foreign matter, such as dirt and water, into the gap in the construction, even when loaded in tension.

It may be preferable to provide an insert for a gap in a construction, on each side or at the top and bottom of the gap.

I claim:

1. A composite load bearing flexible insert for insertion in a gap between adjacent parts of a construction to form an expansion joint therebetween; said insert comprising a flexible body having a substantially flat first surface on one side and having a convex second surface on the opposite side to accommodate variation in shape of said body with expansion and contraction of said gap while leaving said first surface substantially flat, flexible but substantially inextensible fabric reinforcement means extending across the entire width of said body, conforming to the shape of and embedded in said second surface and closely adjacent thereto, to vary in shape with said second surface upon expansion and contraction of said gap, and means for securing said fabric reinforcement means to said construction parts on both sides of the gap for said reinforcement means to support said body and to support loads applied to said first surface.

2. A composite flexible insert as claimed in claim 1 in which the non-planar surface is a part cylindrical surface and, in the mean position of compression of the insert, the centre of curvature of the part cylindrical surface lies in the flat surface.

3. A composite flexible insert as claimed in claim 1, wherein said securing means comprises two elongate members around which said reinforcement means is wrapped, each of which members extends along one side of said body, said members and reinforcement means being arranged to be clamped respectively to the adjacent parts of the construction.

4. A composite flexible insert according to claim 3, wherein the reinforcement means extends beyond the elongate members along the side of said body.

5. A composite flexible insert for insertion in a gap between adjacent parts of a construction to form an expansion joint therebetween; said insert comprising a flexible body having a substantially flat first surface on one side and having a convex second surface on the opposite side to accommodate variation in shape of said body with expansion and contraction of said gap while leaving said first surface substantially flat, flexible but substantially inextensible reinforcement means extending across the entire width of said body, conforming to the shape of said second surface and closely adjacent thereto, to vary in shape with said second surface upon expansion and contraction of said gap, wherein the reinforcement means is rolled up to form two elongate members, each of which extends along one side of said body to form securing means to secure said reinforcement means to said construction, said members and reinforcement means being arranged to be clamped respectively to the adjacent parts of the construction.

6. A composite flexible insert for insertion in a gap between adjacent parts of a construction to form an expansion joint therebetween; said insert comprising a flexible body having a substantially flat first surface on one side and having a convex second surface on the opposite side to accommodate variation in shape of said body with expansion and contraction of said gap while leaving said first surface substantially flat, flexible but substantially inextensible reinforcement means extending across the entire width of said body, conforming to the shape of said second surface and closely adjacent thereto, to vary in shape with said second surface upon expansion and contraction of said gap, wherein said securing means is formed by two keep plates bonded one to each side of said body, the keep plates being arranged to be secured to the adjacent part of the construction respectively, and the flexible reinforcement is in the form of ropes attached between the keep plates.

7. A composite flexible insert as claimed in claim 6 wherein the edge of the bond between each keep plate and said body is at a position remote from the flat surface of said body.

8. A composite flexible insert for insertion in a gap between adjacent parts of a construction to form an expansion joint therebetween; said insert comprising a flexible body having a substantially flat first surface on one side and having a convex second surface on the opposite side to accommodate variation in shape of said body with expansion and contraction of said gap while leaving said first surface substantially flat, flexible but substantially inextensible reinforcement means extending across the entire width of said body, conforming to the shape of said second surface and closely adjacent thereto, to vary in shape with said second surface upon expansion and contraction of said gap, and means for securing said reinforcement means to said construction parts on both sides of the gap for said reinforcement means to support said body, wherein said securing means is formed by two keep plates bonded one to each side of said body, the keep plates being arranged to be secured to the adjacent parts of the construction respectively, and the flexible reinforcement is in the form of a rope which is attached alternately to the two keep plates at a plurality of locations along each keep plate.

9. A composite flexible insert as claimed in claim 8, wherein the edge of the bond between each keep plate and said body is at a position remote from the flat surface of said body.

References Cited
UNITED STATES PATENTS

| | | | |
|---|---|---|---|
| 2,068,035 | 1/1937 | Meyer | 84—18 X |
| 2,111,114 | 3/1938 | Fischer | 94—18 |
| 2,172,773 | 9/1939 | Robertson | 94—18 |
| 2,220,628 | 11/1940 | Stedman | 94—18 |
| 2,224,148 | 12/1940 | Fischer | 94—18 |
| 3,022,713 | 2/1962 | Friberg | 94—18 X |
| 3,055,279 | 9/1962 | Rinker | 94—18 |
| 3,060,817 | 10/1962 | Daum | 94—18 |
| 3,165,986 | 1/1965 | Hirst | 94—18 |
| 3,165,987 | 1/1965 | Hirst | 94—18 |

CHARLES E. O'CONNELL, *Primary Examiner.*

N. C. BYERS, *Assistant Examiner.*